United States Patent
Bai et al.

(10) Patent No.: US 12,287,744 B2
(45) Date of Patent: Apr. 29, 2025

(54) MERGED INPUT/OUTPUT FOR ACCELERATING DIRECTORY LISTING PHASE IN CLIENT DRIVE REDIRECTION

(71) Applicant: Omnissa, LLC, Mountain View, CA (US)

(72) Inventors: Wu Bai, Beijing (CN); Haiwei Zhao, Beijing (CN); Weigang Huang, Beijing (CN); Feng Yan, Beijing (CN); Kun Shi, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 185 days.

(21) Appl. No.: 18/309,385

(22) Filed: Apr. 28, 2023

(65) Prior Publication Data

US 2024/0232106 A1     Jul. 11, 2024

(51) Int. Cl.
  *G06F 13/20*     (2006.01)
  *G06F 16/14*     (2019.01)
  *G06F 16/172*    (2019.01)

(52) U.S. Cl.
  CPC ............ *G06F 13/20* (2013.01); *G06F 16/144* (2019.01); *G06F 16/172* (2019.01); *G06F 2213/40* (2013.01)

(58) Field of Classification Search
  CPC ...... G06F 13/20; G06F 16/144; G06F 16/172; G06F 2213/40
  See application file for complete search history.

(56) References Cited

U.S. PATENT DOCUMENTS

| | | | |
|---|---|---|---|
| 8,131,825 B2 | 3/2012 | Nord | |
| 10,200,499 B1* | 2/2019 | Shavell | .......... H04L 67/02 |
| 2011/0202714 A1 | 8/2011 | Burch | |
| 2011/0251992 A1 | 10/2011 | Bethlehem | |
| 2012/0324365 A1 | 12/2012 | Momchilov | |
| 2016/0299697 A1* | 10/2016 | Chen | .............. G06F 3/0611 |
| 2016/0342519 A1 | 11/2016 | Liashenko | |
| 2016/0352750 A1 | 12/2016 | Dotan | |
| 2017/0220777 A1 | 8/2017 | Wang | |
| 2017/0235950 A1 | 8/2017 | Gopalapura Venkatesh | |
| 2018/0113676 A1 | 4/2018 | De Sousa Webber | |
| 2018/0123795 A1 | 5/2018 | Norman | |
| 2019/0132381 A1 | 5/2019 | Momchilov | |
| 2020/0204589 A1 | 6/2020 | Strogov | |

(Continued)

OTHER PUBLICATIONS

"IFileOperation interface (shobjidl_core.h)"; Published Dec. 5, 2018; https://docs.microsoft.com/en-us/windows/win32/api/shobjidl_core/nn-shobjidl_core-ifileoperation; Retrieved Feb. 24, 2021.

*Primary Examiner* — Eric T Oberly
(74) *Attorney, Agent, or Firm* — Kim & Stewart LLP (57) ABSTRACT

System and methods are provided for improved directory enumeration on shared client directories in virtual desktops. A merged I/O request containing multiple expected I/O requests for enumerating a directory can be produced on the virtual desktop. The merged I/O request can be conveyed to the client device and a merged I/O response containing multiple I/O responses to the expected I/O requests can be received from the client device. The received I/O responses can be stored in cache memory on the virtual desktop and used to respond to subsequent queries for enumerating the directory on the virtual desktop.

20 Claims, 6 Drawing Sheets

(56) References Cited

U.S. PATENT DOCUMENTS

| | | |
|---|---|---|
| 2021/0019070 A1 | 1/2021 | Karr |
| 2021/0173588 A1* | 6/2021 | Kannan ................... G06F 3/061 |
| 2022/0019385 A1 | 1/2022 | Karr |
| 2022/0030062 A1 | 1/2022 | Jennings |
| 2022/0100582 A1 | 3/2022 | Lal |
| 2022/0156303 A1 | 5/2022 | De Sousa Webber |
| 2022/0229922 A1* | 7/2022 | Huang ................. H04L 67/025 |

\* cited by examiner

MERGED INPUT/OUTPUT FOR ACCELERATING DIRECTORY LISTING PHASE IN CLIENT DRIVE REDIRECTION

CLAIM OF PRIORITY

This application is based upon and claims the benefit of priority from International Patent Application No. PCT/CN2023/071014, filed on Jan. 6, 2023, which is incorporated by reference herein in its entirety.

TECHNICAL FIELD

The present disclosure generally relates to virtual desktop infrastructure and more specifically to techniques for redirecting local drives on a client device to a virtual desktop on a remote server.

BACKGROUND

Virtual desktops provided as part of a virtual desktop infrastructure (VDI) or desktop-as-a-service (DAAS) offerings are becoming more commonplace in today's enterprise work environments. The security of having a remotely stored desktop, ability to access the desktop from any location and on any device, centralized desktop management, efficient use of hardware resources, as well as numerous other benefits made possible by VDI/DAAS are a large benefit for many organizations.

In a conventional VDI or DAAS environment, each user in an enterprise is provisioned a virtual desktop and is allowed to access his or her virtual desktop over a remote network connection, such as a WAN connection. The virtual desktops are typically hosted on servers that reside in a data center of the enterprise or a third-party service provider, and each host server may execute multiple virtual desktops. Users can utilize a client device to remotely log into their individual virtual desktop and all of the application execution takes place on the remote host server which is linked to the local client device over a network using a remote display protocol, such as remote desktop protocol (RDP), PC-over-IP protocol (PCoIP), virtual network computing (VNC) protocol, or the like. Using the remote display protocol, the user can interact with applications of the virtual desktop, which are running on the remote host server, with only the display, keyboard, and mouse information communicated with the local client device. A common implementation of this approach is to host multiple desktop operating system instances on separate virtual machines deployed on a server hardware platform running a hypervisor.

Generally, a virtual desktop's data is stored on the host server (e.g., in a virtual disk) where it is accessed locally by the virtual desktop during execution. Some virtual desktops, however, also provide a feature, referred to herein as client drive redirection (CDR), that enables users to access files and folders located on the client device from within the virtual desktop session. With client drive redirection, a user can share files, folders and drives located on the local client system with the remote desktop. For example, a user can allow applications running in the virtual desktop on the host server to access documents and data that are stored on the user's client device. To implement this feature, a CDR component (such as a CDR server) is utilized that forwards input/output (I/O) requests from the virtual desktop to the shared directory on the client device over the network.

However, because I/O operations in CDR are redirected from the virtual desktop to the client device and travel over the network, which can exhibit latencies, performance of certain tasks can be significantly affected. Enumeration or listing of shared directories located on the client device during access is particularly prone to such performance issues. When a directory is accessed, whether to read or write a file or to copy content, the directory is first enumerated during the "listing phase". During this process, various information regarding subdirectory entries such as the names of all the files in the subdirectory, metadata, etc. is acquired and an ordered list is created from the information for the file system of the host server. This process can require numerous sequential requests and responses across the network as the system retrieves this information. The number of such requests and responses can be particularly large in cases where the subdirectory contains many files and folders/subdirectories. When a virtual desktop accesses a shared directory on a client device with CDR, these requests travel over the network between the virtual desktop and the client device. As a result, the performance of tasks that involve directory enumeration, such as file accesses and copying, can be particularly poor in CDR, especially in cases where the shared directory contains many files and subdirectories.

What is needed is a more efficient way for performing directory listing on shared drives when using client drive redirection in virtual desktops.

DETAILED DESCRIPTION

Systems and methods in accordance with various embodiments of the present disclosure overcome at least some of the above-mentioned shortcomings and deficiencies by providing more efficient ways to perform directory listing on shared drives when using client drive redirection (CDR) in virtual desktops. In particular, embodiments described herein leverage merged input/output (I/O) requests that allow the directory listing phase to be performed more efficiently, reducing the number of back-and-forth trips over the network when using CDR.

The process can begin when a request is produced on a virtual desktop (e.g., by a user of the virtual desktop) requiring listing (also referred to herein as "enumeration") of a subdirectory on a shared drive being accessed on the client device via CDR. Different types of requests made in the virtual desktop can require enumeration of a directory on the shared drive. For example, such a request can be to copy a folder in the shared drive from the client device to the virtual desktop, to list contents of a directory on the shared drive in the virtual desktop session when opening or accessing a folder/file on the shared drive in the virtual desktop session, etc.

After the request to enumerate the subdirectory on the shared drive in the virtual desktop is received, a series of sequential input/output (I/O) requests can be generated by the virtual desktop (e.g., by the virtual desktop operating system (OS)) for retrieving the directory listing information from the shared drive. The I/O requests can be intercepted by a redirection driver and forwarded to a CDR server running in the virtual desktop, which can handle the sending and receiving of I/O requests and responses, respectively, to/from the client device.

The CDR server can determine and generate multiple I/O requests that are expected to be received from the OS later and produce a merged I/O request embedding the multiple expected requests (e.g., in a single packet request). The CDR server can convey the merged I/O request to a CDR client on the client device, and the CDR client can perform each I/O request contained in the merged request to produce corresponding I/O responses. The CDR client can then produce a merged I/O response by merging the I/O responses (e.g., in a single packet response). The merged I/O response can be conveyed back to the CDR server and the information can be stored in cache memory on the virtual desktop. Later, the CDR server can receive the expected I/O requests and, in response, retrieve the responses to the expected I/O requests from the cache memory and convey them to complete the expected I/O requests.

As a result, the number of packets transmitted between the client computing device and the virtual desktop is reduced by merging multiple I/O requests into a single packet and by merging multiple I/O responses into a single packet. Consequently, the efficiency and performance of directory enumeration when using CDR can be significantly improved, especially when the directory contains many files and network performance is poor.

As used throughout this disclosure in the context of remote desktop environments, the terms, "desktop", "remote desktop", and "virtual desktop" are used interchangeably and refer to an instance of an operating system and/or applications that run(s) remotely with respect to the user. In a conventional VDI or DAAS environment, each virtual desktop corresponds to a virtual machine (VM) executed on a host server (i.e., a host computing device) that is physically located in a remote datacenter. Each host server may host any number of virtual machines (e.g., tens, hundreds, etc.) and each virtual machine may be owned by an individual user. The virtual machine typically includes a guest operating system (e.g., Windows) capable of executing applications for the user and the virtual machine is used to provide a virtual desktop for the individual user. The user who owns the virtual desktop can remotely log into his or her virtual desktop using a client device that establishes a network connection (e.g., Wide Area Network connection) with the host server and remotely execute various applications on the virtual machine as if the desktop was running on the user's local client device. The client device can be any computing device capable of establishing a network connection, including but not limited to personal computers (PCs), laptops, mobile phones, tablet computers, wearable devices (e.g., smart watches, electronic smart glasses, etc.) or the like.

When a client device is accessing a remote desktop using a remote display protocol (e.g., RDP, PCoIP, VNC, etc.), the graphical user interface (GUI) of the desktop is generated on the server, the GUI image data is then encoded and transmitted over the network to the client device, where it is decoded and displayed to the user. For example, in one embodiment, the framebuffer pixel data on the server is encoded using a codec, such as H264, and transmitted over an Internet connection to the client, where the data is decoded and rendered on a local display screen to the user. Similarly, any user input information, such as keyboard and mouse events, is transmitted from the client device to the server over the network connection, where it may in turn cause various updates to the GUI of the remote desktop. In this manner, the user is able to view the GUI of the remote desktop and interact with it as if the desktop was actually running on the local client device, even though the desktop is actually executing remotely.

Figure 1:
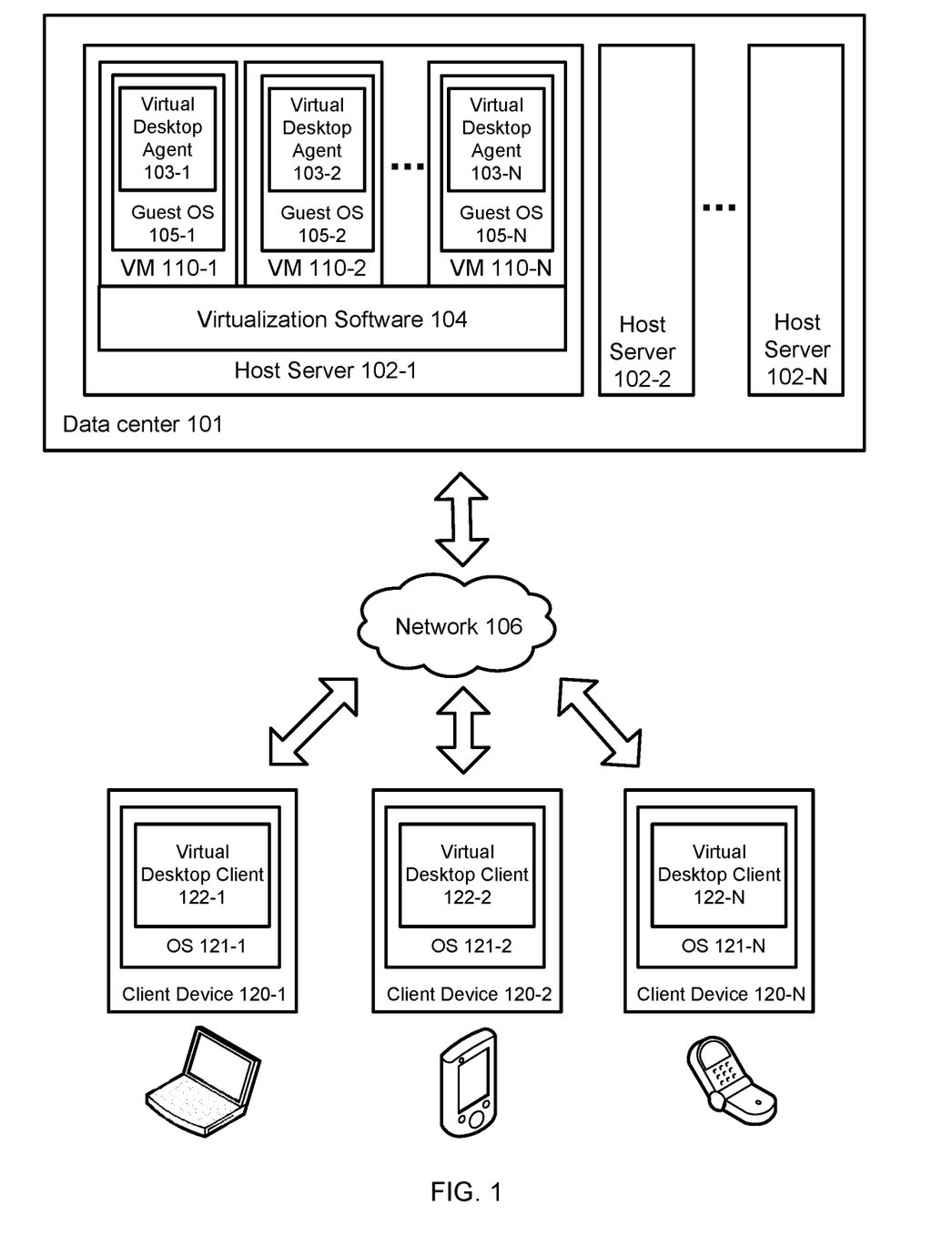
FIG. 1 illustrates an example of a virtual desktop environment, in accordance with various embodiments.

FIG. 1 illustrates an example of a virtual desktop environment, in accordance with various embodiments. The virtual desktop environment, such as VDI or DAAS environment, includes host servers (102-1, 102-2, 102-N) that are communicatively coupled with a number of client devices (120-1, 120-2, 120-N) via a network 106. Network 106 may be a wide area network (WAN), or other form of remote communication link between the host servers (102-1, 102-2, 102-N) and client devices (120-1, 120-2, 120-N). Network 106 may further include numerous other components, such as one or more firewalls, connection brokers, management servers, etc., which are not shown here so as not to obscure salient features of the remote desktop environment. Host servers (102-1, 102-2, 102-N) may physically reside in a data center 101 of the enterprise (e.g., in case of VDI) or in a data center of a third-party service provider (e.g., in case of DAAS).

By way of illustration, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102-1. In this context, the terms "desktop", "remote desktop", and "virtual desktop" refer to a computing environment in which a user can launch, interact with, and manage the user's applications, settings, and data. Each client device (120-1, 120-2, 120-N) can allow a user to view on a desktop graphical user interface (on a local display device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each hosting one desktop for each one of the five users. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a virtual desktop client (e.g., 122-1, 122-2, 122-N). For example, the virtual desktop client (e.g., 122-1, 122-2, 122-N) can be a standalone, designated client application ("native client"), or a web browser ("web client"). In some cases, a standard web browser may be modified with a plugin to operate as a web client. The interaction between the virtual desktop and the client device can be facilitated by such a virtual desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1, 110-2, 110-N). In particular, the interaction can be performed by the virtual desktop agent transmitting encoded visual display information (e.g., framebuffer data) over the network to the virtual desktop client and the virtual desktop client in turn transmitting user input events (e.g., keyboard, mouse events) to the remote desktop agent.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment would include many more host servers, which may be distributed over multiple data centers, which might include many other types of devices, such as switches, power supplies, cooling systems, environmental controls, and the like, which are not illustrated herein. Similarly, a single host server would typically host many more virtual machines than what is shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

Generally, the data of a virtual desktop, such as application and user data, is stored on the host server (e.g., 102-1, 102-2, 102-N) (e.g., in a virtual disk) where it is accessed locally by the VM (e.g., 110-1, 110-2, 110-N) during execution. To enable the virtual desktop to also access data located on a client device (e.g., 120-1, 120-2, 120-N), virtual desktops can utilize a feature referred to herein as client drive redirection (CDR), which enables the virtual desktop to access files and folders located on the client device (e.g., 120-1, 120-2, 120-N) from within the virtual desktop session. Hence, applications running in the VM (e.g., 110-1, 110-2, 110-N) can access files, folders and drives located on the remote client (e.g., 120-1, 120-2, 120-N). For example, a user can allow applications running in the virtual desktop on the host server (e.g., 102-1, 102-2, 102-N) to access documents and data that are stored on the user's client device (e.g., 120-1, 120-2, 120-N). Similarly, the user can copy data from the client device (e.g., 120-1, 120-2, 120-N) to a location (e.g., directory) physically located on the host server (e.g., 102-1, 102-2, 102-N), or the user can copy data from the virtual desktop on the host server (e.g., 102-1, 102-2, 102-N) to the client device (e.g., 120-1, 120-2, 120-N).

With the CDR feature, data located on the client device (e.g., 120-1, 120-2, 120-N) can be presented in virtual drives in the VM (e.g., 110-1, 110-2, 110-N). For example, directories, files, or drives located on the client device (e.g., 120-1, 120-2, 120-N) can be presented in virtual drives in the virtual desktop. Users can work with the virtual drives in the same way they work with disk drives that are local on the host server (e.g., 102-1, 102-2, 102-N), and applications running in the virtual desktop can likewise access the virtual drives in the same way as local drives on the host server (e.g., 102-1, 102-2, 102-N). When an input/output (I/O) request is produced on the virtual desktop (e.g., by an application in the virtual desktop) to a shared directory located on the client device (e.g., 120-1, 120-2, 120-N), a CDR component running in the virtual desktop can forward the I/O request to the client device (e.g., 120-1, 120-2, 120-N) over the network. A corresponding client-side CDR component on the client device (e.g., 120-1, 120-2, 120-N) can receive and implement the I/O request, whether by retrieving data and sending it back to the virtual desktop, by writing to a file on the client device (e.g., 120-1, 120-2, 120-N), etc. as the case may be.

When a shared client-side directory is accessed on the virtual machine or when performing certain tasks on the shared drive, the directory may first need to be enumerated. As mentioned above, in a traditional remote desktop deployment that implements CDR, the process of directory enumeration on a shared client directory can require a significant number of sequential requests and responses that are sent back and forth between the virtual desktop and the client device (e.g., 120-1, 120-2, 120-N) over the network. For example, first the system may need to verify if a directory exists, then it may need to obtain metadata information such as the time stamp for the folder and its size, and this may need to be performed for each contained file and subdirectory. When the directory is enumerated, the system (e.g., the application making the directory access) may further need to identify each entry in the directory, which may require a separate request and response. Particularly where the directory being opened has many entries (files and/or subdirectories), this process can consume a long time and have detrimental effects on performance.

Figure 2:
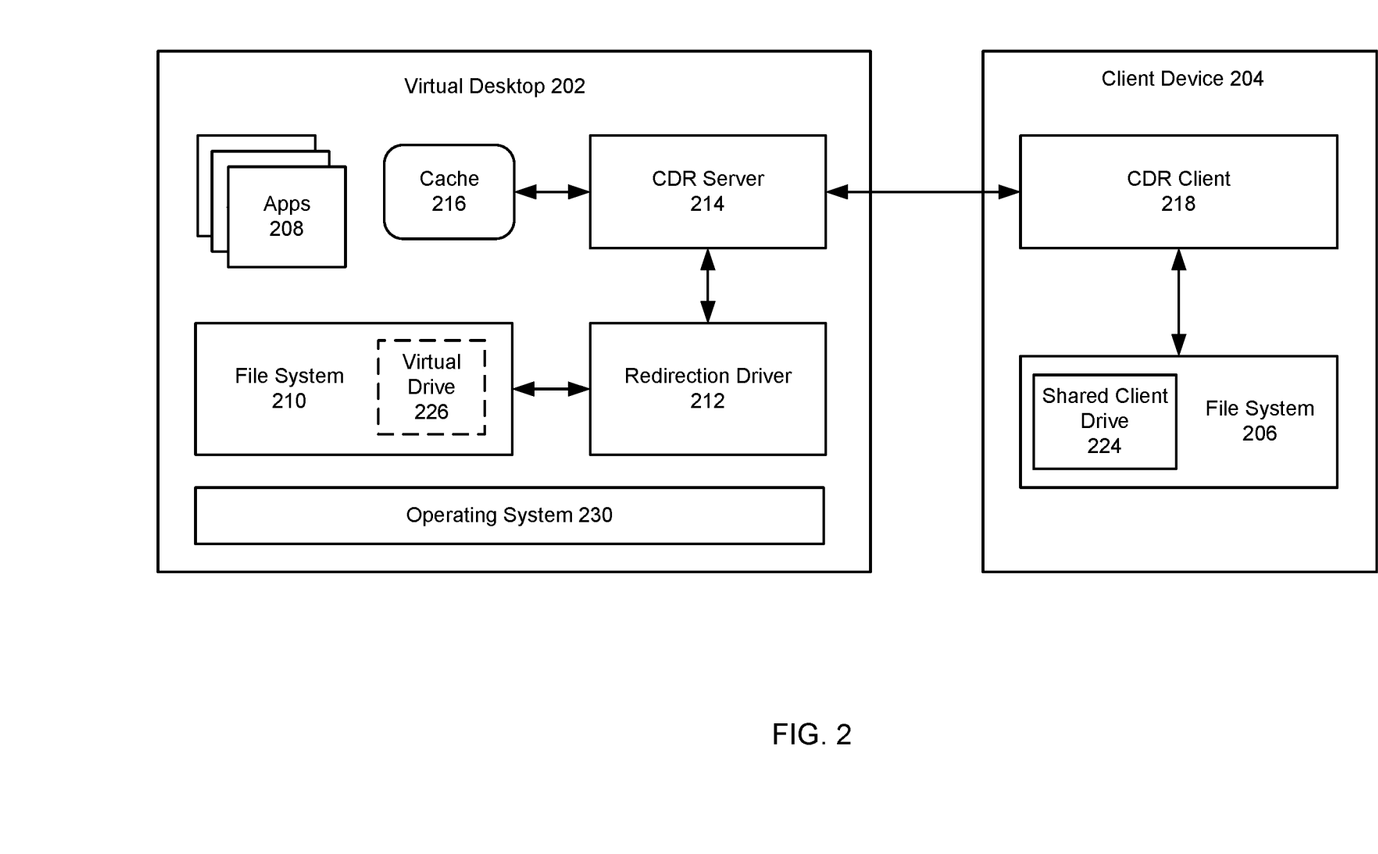
FIG. 2 illustrates an example architecture of a system for efficient directory listing in client drive redirection on virtual desktops, in accordance with various embodiments.

FIG. 2 illustrates an example architecture of a system for efficient directory listing in client drive redirection on virtual desktops, in accordance with various embodiments. In the example of FIG. 2, a virtual desktop 202 is connected to a client device 204 over a network during a virtual desktop session. Several applications 208 can run on an operating system 230 in the virtual desktop 202. The client device 204 can contain a file system 206, which can be an NTFS/FAT22 file system for example, and the server can also contain a file system 210, which can also be an NTFS/FAT22 file system for example. The virtual desktop 202 and the applications 208 can access the file system 210 locally in the virtual desktop. The client file system 206 or portions of it (e.g., drives, directories, folders, files, etc.) can also be made available for access to the virtual desktop 202 and the applications 208 via CDR. For example, a virtual drive 226 can be presented in the virtual desktop 202 that provides access on the virtual desktop 202 to certain directories, volumes, folders, files, etc. that are on a shared client drive 224 physically located in the client device file system 206. In various embodiments, the shared client drive 224 may be configured (e.g., by an administrator or by the user) to share certain directories, folders, etc., and those portions can be presented in the virtual drive 226 for access by the virtual desktop 202.

For example, in some embodiments the system can allow the user to designate a directory (e.g., the shared client drive 224) of the client computing device 204 to be a "shared directory." The shared directory can then be visible from within the remote desktop session such that the user can see the names of subdirectories and files in the shared directory (e.g., in the virtual drive 226) even though the content of the files is stored on the client computing device 204 in the shared client drive 224.

The virtual desktop 202 (or an application 208 in the desktop 202) can access the shared client drive 224 by producing input/output (I/O) requests targeting the virtual drive 226. For example, an application 208 can produce a read or write request to a file in the virtual drive 226, which can then be redirected to the shared drive 224, as will be described in more detail below.

In various embodiments, read or write requests to the virtual drive 226 made on the virtual desktop 202 can be routed to the shared client drive 224 by a redirection driver 212. In an embodiment utilizing the Windows operating system (OS) the driver 212 can for example be an RDPDR (Remote Desktop Device Redirector Driver) driver. I/O requests to the virtual drive 226 can be forwarded to or intercepted by the redirection driver 212, conveyed to a CDR server 214 from the redirection driver 212, and conveyed to a CDR client 218 running on the client device 204. The CDR client 218 can perform the requests on the shared client drive 224 and generate corresponding responses. The responses to the I/O requests can then be conveyed by the CDR client 218 back to the CDR server 214, which can forward the I/O responses to the redirection driver 212, which can complete the I/O request (e.g., information can be forwarded to a requesting application 208, to the OS, etc. by the redirection driver 212).

This way, client drive redirection enables the user to share local folders to the remote desktop 202. Through CDR, the shared folder/drive on client side is redirected to the remote desktop 202, and the user can access the folder/drive in the remote desktop 202 like a mounted network drive.

When various types of requests are made on the virtual desktop 202 to the virtual drive 226, such as requests to list contests of a folder/directory, to copy or transfer files or folders from the virtual drive 226, etc., the system can first enumerate the requested subdirectory to create an ordered list of the subdirectory and its contents for the file system. The directory enumeration may be necessary to perform such request. During the enumeration process, also referred to herein as the directory "listing phase", various information about the subdirectory in the shared drive 224 can be obtained to create the ordered listing of contents. Such information can include names of all files in the subdirectory, names of folder in the subdirectory, various metadata, etc.

For example, directory enumeration information can be information describing the structure, content, file lists, and various other aspects of the directory and its contained files and subdirectories. Directory enumeration information can comprise the metadata of the directory, metadata of contained files, and metadata of contained subdirectories. The information can include directory entries and data such as creation time, last access time, file size, file attributes, etc.

As mentioned, with previous CDR technology, enumerating a subdirectory in a shared client drive (such as shared client drive 224), especially when it accommodates many files and subdirectories, could take a long time due to numerous back-and-forth requests and responses sent over the network between the virtual desktop and the client. For example, with previous CDR technology, when a user operated files/folders in the shared drive during a remote desktop session (such as to open a file, copy a file, list directory content etc.), a long process could be triggered. First, the operating system (e.g., Windows® OS, available from Microsoft Corp.) would generate a large number of I/O request packets (IRPs). Then, the redirection driver (e.g., an RDPDR driver) handled the IRPs and formatted each IRP so it could be forwarded to a CDR server (e.g., a VMware Horizon® CDR server, available from VMware, Inc.). The CDR server then forwarded the I/O requests to the client side via the network. The CDR client (e.g., a VMware Horizon® CDR client, available from VMware, Inc.) handled the packet, performed file operations, and sent a response to the CDR server. The CDR server then forwarded the response to the redirection driver, which conveyed it to the operating system to complete the I/O request. These steps were required to complete a single I/O request, and requests/responses took place sequentially. As a result, substantial time was spent on transferring I/O request packets and corresponding responses via the network, making directory enumeration extremely inefficient.

For example, when a user copied a file from client to the server side (to a local drive in the remote desktop) using CDR (e.g., using explorer.exe to copy a file in a shared folder to a local drive under the remote desktop), the redirection driver (RDPDR) and file system could produce an I/O request sequences as follows (a real-world scenario may include more requests):

```
IRP_MJ_CREATE
IRP_MJ_QUERY_INFORMATION (FileBasicInformation)
IRP_MJ_QUERY_INFORMATION (FileStandardInformation)
IRP_MJ_QUERY_INFORMATION (FileAttributeInformation)
... ...
IRP_MJ_QUERY_VOLUME_INFOMATION
IRP_MJ_READ (offset 0)
... ...
IRP_MJ_READ (end of file)
IRP_MJ_CLOSE
```

In different operating systems, such as in different versions of Windows®, the I/O sequence for directory enumeration may vary. In some OS versions, the I/O sequences for the listing phase can be very complex and consume a long time when employing CDR. For example, on Windows® server 2019, when copying a folder (for example, folder named "Folder1", which includes N files: file1, file2 ... fileN), the I/O pattern for the listing phase may be as follows:

```
Listing file1:
    IRP_MJ_CREATE (open testF)
    IRP_MJ_QUERY_INFORMATION (FileBasicInformation)      (query info of testF)
    IRP_MJ_QUERY_INFORMATION (FileStandardInformation)   (query info of testF)
    IRP_MJ_DIRECTORY_CONTROL (IRP_MN_QUERY_DIRECTORY) (query info of file1)
    IRP_MJ_CLOSE
```

```
Listing file2:
  IRP_MJ_CREATE (open testF)
  IRP_MJ_QUERY_INFORMATION (FileBasicInformation)      (query info of testF)
  IRP_MJ_QUERY_INFORMATION (FileStandardInformation)   (query info of testF)
  IRP_MJ_DIRECTORY_CONTROL (IRP_MN_QUERY_DIRECTORY) (query info of file2)
  IRP_MJ_CLOSE
... ...
Listing fileN:
  IRP_MJ_CREATE (open testF)
  IRP_MJ_QUERY_INFORMATION (FileBasicInformation)      (query info of testF)
  IRP_MJ_QUERY_INFORMATION (FileStandardInformation)   (query info of testF)
  IRP_MJ_DIRECTORY_CONTROL(IRP_MN_QUERY_DIRECTORY) (query info fileN)
  IRP_MJ_CLOSE
```

As can be seen in this example, several duplicated or related I/O requests are conveyed. Further, because the I/O handling is serialized (i.e., the system waits for a response to a request before proceeding to the next one), the network bandwidth is not efficiently utilized. The performance can be particularly poor on slow networks due to the numerous I/O round trips, many of which are duplicated and similar.

In various embodiments, merged I/O requests and response can be utilized to improve the performance of directory enumeration in CDR, as will be described in further detail below. The process can begin when a request is produced on the virtual desktop 202 to enumerate a directory in the shared drive 224. In response to the request, the OS 230 of the virtual desktop can initiate a sequence of I/O requests to obtain directory listing information as described above, which requests can be redirected by the redirection driver 212 to the CDR Server 214.

After the directory listing process is initiated, the CDR server 214 can determine and generate multiple I/O requests that are expected to be received from the OS 230 later during the listing process. The CDR server 214 can then produce a merged I/O request merging and embedding the multiple expected requests (e.g., in a single packet request). For example, the merged I/O requests can request information about each file contained in the directory being enumerated or the merged I/O requests can request different classes of information (different types of metadata) about the directory being enumerated.

In various embodiments, the CDR server can obtain various information about the directory being enumerated for generating the merged I/O request. For example, the directory can be queried to obtain all contained files and folders and this information can be used by the CDR server to generate the I/O requests that it embeds into the merged I/O request. For example, at the beginning of the listing phase, an I/O request can be produced requesting to list or enumerate all the files contained in the folder that is being enumerated. For example, a request such as IRP_MN_QUERY_DIRECTORY with the parameter: *, requesting to enumerate all files in the directory can be produced by the OS 230 and conveyed to the CDR Client 218 via the redirection driver 212 and CDR Server 214. In response to the request, the CDR Client 218 can query the client file system 206 and return a list providing information identifying all files contained in the folder. The CDR Server 214 can receive the list and save it in a file order list. The CDR Server 214 can then use this file order list to produce the expected I/O requests and merge the expected I/O requests to produce the merged I/O request.

As will be described in further detail below, in various embodiments the CDR server can produce the merged I/O request by appending expected I/O requests to an I/O request that the CDR server receives from the redirection driver. For example, when the CDR server receives a query directory I/O request from the redirection driver for metadata of a particular file in the folder, it can append expected query directory I/O requests for metadata of other files in the folder to produce a merged I/O request and forward the merged query directory I/O request to the CDR client. Similarly, when the CDR server receives a query information I/O request from the redirection driver for a particular class of information about the folder, it can append expected query information I/O requests for different classes of information about the folder to produce a merged query information I/O request and forward the merged I/O request to the CDR client.

After the CDR server 214 conveys the merged I/O request to the CDR client 218 on the client device 204, the CDR client 218 can parse the merged I/O request and perform each I/O request contained in the merged request to produce corresponding I/O responses. The CDR client 218 can then produce a merged I/O response by merging the I/O responses (e.g., in a single packet response). The merged I/O response can be conveyed back to the CDR server 214 by the CDR client 218 and the information can be stored in cache memory 216 on the virtual desktop 202 so that it can be subsequently used to complete further listing operations. In various embodiments, the cache can be a per-thread file information cache 230. The data in the cache 216 can then be used to complete further listing operations that occur in the listing phase and originate from the same thread context.

As the enumeration process continues, the OS 230 can produce the expected I/O requests that were included in the merged I/O request(s) by the CDR server. Each expected I/O request can be redirected by the redirection driver 212 to the CDR Server 214 and the CDR server 214 can retrieve the previously cached I/O response to the expected I/O request from the cache memory 216 and convey it to the redirection driver 212, which can in turn convey it to the OS 230 to complete the request.

Figure 3:
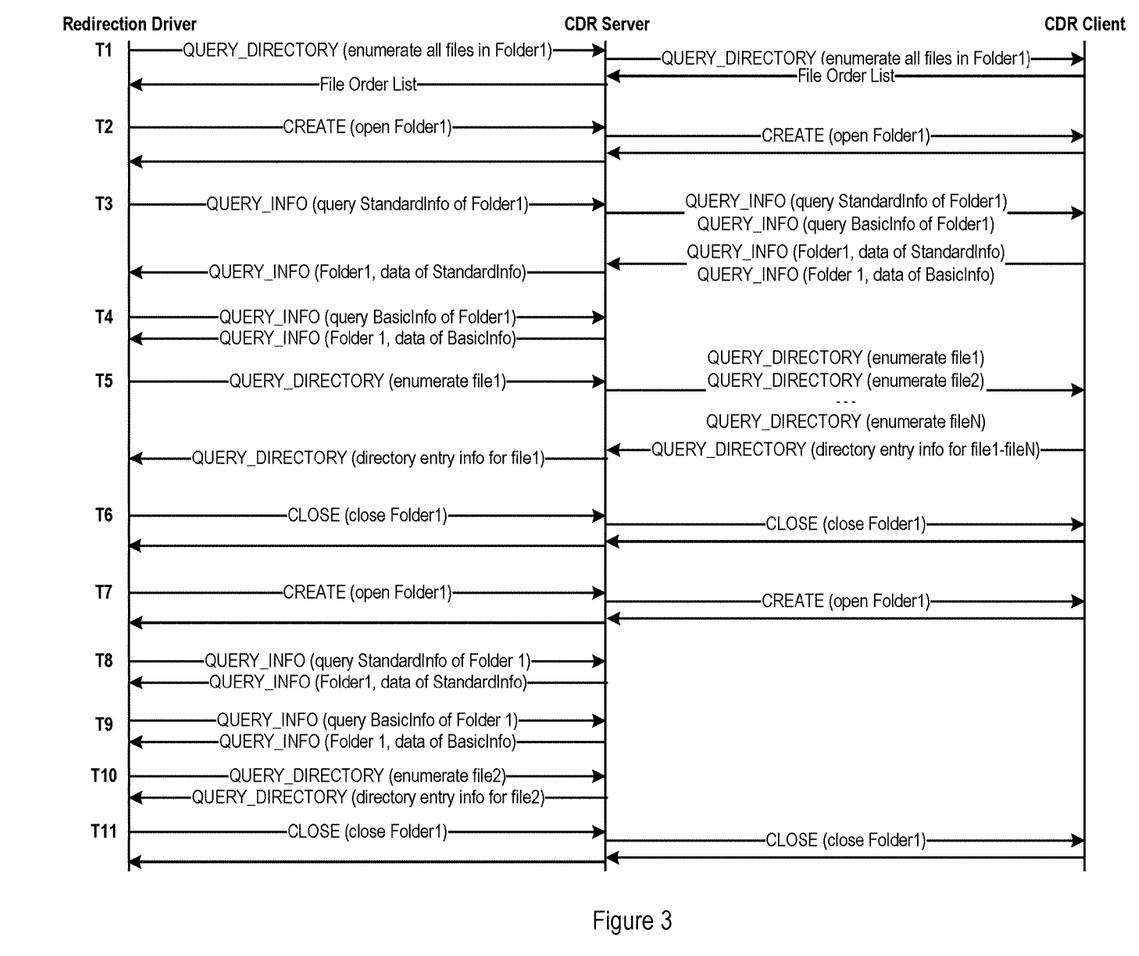
FIG. 3 is a sequence diagram illustrating an example of I/O requests and I/O responses transmitted during directory listing, in accordance with various embodiments.

FIG. 3 is a sequence diagram illustrating an example of I/O requests and I/O responses transmitted during directory listing, in accordance with various embodiments. In the example of FIG. 3, an example folder "Folder1" containing N files, "file1" through "fileN", is being enumerated. The redirection driver, CDR server, and CDR client in the example of FIG. 3 may be the redirection driver 212, CDR server 214, and CDR client 218 of the example of FIG. 2. Accordingly, the illustrated I/O requests conveyed by the redirection driver to the CDR server can be normal requests generated by the virtual desktop OS (e.g., OS 230) as it works on enumerating Folder1, which requests can be formatted and redirected by the redirection driver 212 to the CDR Server 214 per the CDR framework. The illustrated I/O responses conveyed to the redirection driver 212 by the CDR server 214 can be subsequently forwarded by the redirection driver to the operating system 230 of the virtual desktop to produce the directory listing.

As illustrated, at the beginning of the sequence at time T1, an I/O request (QUERY_DIRECTORY (enumerate all files in Folder1)) requesting to list or enumerate all the files contained in Folder1 can be redirected by the redirection driver to the CDR server. The request may be generated by the virtual desktop OS and be redirected by the redirection driver to the CDR server. The CDR server can convey the request to the CDR client to be executed on the client device. For example, this can be a request such as IRP_MN_QUERY_DIRECTORY with parameter: *, requesting to enumerate all files in the directory.

In response to the request, the CDR Client can query the client device and retrieve the requested information including a file order list of files in Folder1, which can identify files in Folder1. The CDR Client can then convey the information back to the CDR Server. The CDR Server can save the file order list and use it to determine and generate certain expected I/O requests, as will be described further below. As illustrated, the CDR server can then convey the file order list to the redirection driver, which can further convey it to the OS of the virtual desktop to use in performing the directory listing.

At time T2, the redirection driver can convey an I/O request (CREATE (open Folder1)) to the CDR Server to open Folder1. The CDR server can convey the I/O request to the CDR client, which can execute the request and send a corresponding I/O response back to the CDR server, which can then forward the response to the redirection driver.

At time T3, the redirection driver can send a query information I/O request (QUERY_INFO (query StandardInfo of Folder1)) to the CDR server for standard information about Folder1. Generally, "query information" I/O requests (e.g., IRP_MJ_QUERY_INFORMATION requests), can be requests for enumeration information of a particular file or subdirectory, such as requests for metadata about a particular file or a particular directory. For example, this can be a request such as IRP_MJ_QUERY_INFORMATION (query StandardInfo of Folder1), requesting standard information of Folder1. The "standard information" may be metadata information such as the number of bytes allocated to Folder1. The redirection driver can forward the I/O request to the CDR server and the CDR server can produce a merged query information request by appending additional query information I/O requests to the received query information I/O request before forwarding it to the CDR client.

For example, the appended additional query information I/O requests can be requests that are expected to be received later from the redirection driver, such as requests to query Folder1 for more classes of information. As illustrated, in this case the CDR server can append a query information I/O request for basic information about Folder1. For example, the "basic information" may be metadata information such as the creation time of Folder1. Accordingly, both I/O requests, the standard (e.g., per the RDP protocol) I/O request for standard information and the appended I/O request for the basic information, can be conveyed by the CDR server to the CDR client in the single merged message (e.g., in a single packet). In other embodiments, additional requests can also be appended, such as query information I/O requests requesting different classes of information (e.g., different types of metadata) about Folder1. For example, an additional query information I/O request may be for "attribute information", which may be metadata information such as whether a file/folder is read-only.

As illustrated, the merged query information request containing the standard (e.g., per the protocol) I/O request for standard information (QUERY_INFO (query StandardInfo of Folder1)) and the appended I/O request for the basic information (QUERY_INFO (query BasicInfo of Folder1)) can be conveyed to the CDR client. The CDR client can separate and parse the merged I/O request and execute each constituent I/O request to produce corresponding I/O responses, one I/O response containing the standard information of Folder1 (QUERY_INFO (Folder1, data of StandardInfo)) and the other I/O response containing the basic information of Folder1 (QUERY_INFO (Folder1, data of BasicInfo)). The CDR client can then produce a merged I/O response containing both I/O responses and convey the merged response to the CDR server. Similar to the merged I/O request, the merged I/O response can include a standard (per protocol) I/O response for the standard I/O request (i.e., the QUERY_INFO (query StandardInfo of Folder1) request) to which the responses to the appended requests (e.g., the QUERY_INFO (Folder 1, data of BasicInfo) response) can be appended.

The CDR server can receive the merged response, separate the contained I/O responses, and convey the standard I/O response for the Folder1 standard information (QUERY_INFO (Folder1, data of StandardInfo)) to the redirection driver. The CDR server can store the appended I/O response for the Folder1 basic information (QUERY_INFO (Folder 1, data of BasicInfo)) in cache memory (e.g., directory cache 216) so it can be used to respond to later queries that may be received from the redirection driver.

In various embodiments, to ensure data consistency, the cache can have a very short timeout value (e.g., if it is intended to be consumed only for I/O requests of a subsequently accessed file). Once the timeout time expires, the cache can be erased.

At time T4, the redirection driver can send a query information I/O request (QUERY_INFO (query BasicInfo of Folder1)) to the CDR server for basic information about Folder1. With previous technologies, the CDR server would at this point send the I/O request to the CDR client and receive a corresponding I/O response, thereby incurring another cross-network trip. However, because the response to this I/O request was already prefetched previously, the CDR server can now retrieve the I/O response for the Folder1 basic information (QUERY_INFO (Folder 1, data of BasicInfo)) from the directory cache and return it to the redirection driver in response.

At time T5, the redirection driver can send a query directory I/O request (QUERY_DIRECTORY (enumerate file1)) to the CDR server for metadata information (enumeration information) of file1 in Folder1. Generally, "query directory" I/O requests (e.g., IRP_MJ_DIRECTORY_CONTROL requests) can be requests for enumeration information of subitems in a directory, such as metadata of subitems in a directory (e.g., metadata of a contained file or subdirectory). For example, this can be a request such as IRP_MJ_ QUERY_DIRECTORY (enumerate file1), requesting enumeration or metadata information of file1 in Folder1. The redirection driver can forward the query directory I/O request (which can be a standard request per the RDP protocol) to the CDR server and the CDR server can produce a merged query directory request by appending additional query directory I/O requests (for other files in the folder) to the forwarded query directory I/O request for file1. The CDR server can determine/identify files in Folder1 for which the additional query directory I/O requests should be produced based on the file order list that it stored previously. As illustrated, in this case the CDR server can append a query directory I/O request for each subsequent file after file1 in the folder (i.e., files file2 through fileN). Namely, a query directory I/O request for enumeration information of file2 (QUERY_DIRECTORY (enumerate file2)) and other contained files in Folder1 through fileN (QUERY_DIRECTORY (enumerate fileN)) can be generated by the CDR server, and all the query directory I/O requests can be appended to the initial standard query directory I/O request for file1 metadata (e.g., into one packet) so they can be conveyed to the CDR client together in the merged I/O request, as illustrated.

The CDR client can receive the merged query directory I/O request, parse it, and execute each of the constituent query directory I/O requests for metadata of files file1 through fileN to retrieve the requested data and produce corresponding I/O responses. Namely, a query directory I/O response for each query directory I/O request in the merged I/O request can be produced. For example, a query directory I/O response for file1 containing metadata/enumeration information of file1 (QUERY_DIRECTORY (directory entry info for file1)) and for each subsequent file through fileN can be produced and the I/O responses can be merged into one response (QUERY_DIRECTORY (directory entry info for file1-fileN)) that can then be conveyed to the CDR server, as illustrated.

Similar to the merged query directory I/O request, the merged query directory I/O response can include a standard (per protocol) I/O response for the standard I/O request (i.e., the QUERY_INFO (QUERY_DIRECTORY (enumerate file1)) request) to which the responses to the appended requests for file2 through fileN can be appended.

The CDR server can receive the merged response, read or decode the merged I/O response and extract individual I/O responses. The CDR server can then convey the standard query directory I/O response for file1 (QUERY_DIRECTORY (directory entry info for file1)) to the redirection driver in response to the query directory I/O request for file1 (QUERY_DIRECTORY (enumerate file1)). The CDR server can store the other query directory I/O responses (for files file2 through fileN) in the cache memory so they can be used to respond to later queries that may be received from the redirection driver.

At time T6, the redirection driver can convey an I/O request to the CDR Server to close Folder1 (CLOSE (close Folder1)), as illustrated. The CDR server can convey the I/O request to the CDR client, which can execute the request and send a corresponding I/O response back to the CDR server, which can then forward the response to the redirection driver.

At this point, the system has enumerated file1 (which was performed in steps from time T2 to T6) and can move forward to enumerating file2 (which will be performed in steps from time T7 to T11).

At time T7, the redirection driver can convey an I/O request (CREATE (open Folder1)) to the CDR server to open Folder1. The CDR server can convey the I/O request to the CDR client, which can execute the request and send a corresponding I/O response back to the CDR server, which can then forward the response to the redirection driver.

At time T8, the redirection driver can send a query information I/O request to the CDR server for standard information about Folder1. Because the response to this I/O request was fetched and cached previously, the CDR server can retrieve the I/O response for the Folder1 standard information (QUERY_INFO (Folder 1, data of StandardBasicInfo)) from the directory cache and return it to the redirection driver in response, as illustrated.

At time T9, the redirection driver can send a query information I/O request to the CDR server for basic information about Folder1. Because the response to this I/O request was fetched and cached previously, the CDR server can retrieve the I/O response for the Folder1 basic information (QUERY_INFO (Folder 1, data of BasicInfo)) from the directory cache and return it to the redirection driver in response, as illustrated.

At time T10, the redirection driver can send a query directory I/O request (QUERY_DIRECTORY (enumerate file2)) to the CDR server for metadata information (enumeration information) of file2 in Folder1. With previous technologies, the CDR server would at this point forward the I/O request to the CDR client and receive a corresponding I/O response. However, because the response to this I/O request was prefetched previously, the CDR server can now retrieve the query directory I/O response containing the directory entry info for file2 (QUERY_DIRECTORY (directory entry info for file2)) from the directory cache and return it to the redirection driver in response.

At time T11, the redirection driver can convey an I/O request to the CDR Server to close Folder1 (CLOSE (close Folder1)), as illustrated. The CDR Server can convey the I/O request to the CDR client, which can execute the request and send a corresponding I/O response back to the CDR server, which can then forward the response to the redirection driver.

At this point, the system has enumerated file2 (which was performed in steps from time T7 to T11). Because the query directory and query information I/O responses were prefetched and made available in cache, the number of cross network trips (between the CDR server and CDR client) was drastically reduced. The process can continue in a similar way to enumerated the remaining files in Folder1 (file3 through fileN), where the query directory I/O request for the files in the folder can be fulfilled from cache as described above instead of making cross-network trips. Similarly, the query information I/O requests can be fulfilled from cache. As a result, the directory listing phase can be completely significantly more efficiently than with previous technologies.

Figure 4A:
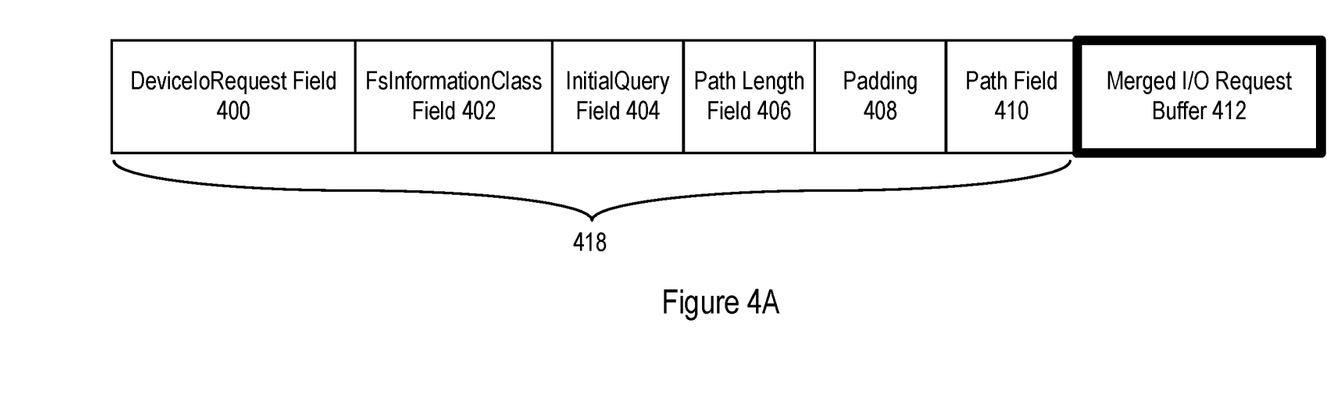
FIG. 4A is a diagram illustrating an example of a merged I/O request packet format, in accordance with various embodiments.

FIG. 4A is a diagram illustrating an example of a merged I/O request packet format, in accordance with various embodiments. This example may correspond to a merged query directory I/O request, such as the merged query directory I/O request generated and conveyed by the CDR server to the CDR client in the example of FIG. 3. As described in the example of FIG. 3, the redirection driver can convey a standard (e.g., per the RDP protocol) query directory I/O request for metadata of file1 (QUERY_DIRECTORY (enumerate file1)) to the CDR server, which can generate additional query directory I/O requests for metadata of other files in the folder (e.g., file2-fileN) and append those requests (QUERY_DIRECTORY (enumerate file2) . . . QUERY_DIRECTORY (enumerate fileN)) to the standard query directory I/O request (QUERY_DIRECTORY (enumerate file1)) that it received from the redirection driver. The CDR server can then pass the merged query directory I/O request to the CDR client.

The example of FIG. 4A illustrates an example packet format of such a merged query directory I/O request. As illustrated in the example of FIG. 4A, the first portion 418 of the merged I/O request packet can represent the standard (e.g., following the RDP protocol) query directory I/O request for metadata of file1 (QUERY_DIRECTORY (enumerate file1)) conveyed by the redirection driver. For example, these portions can represent the IRP_MJ_DIRECTORY_CONTROL (minor type is IRP_MN_QUERY_DIRECTORY) request defined by the RDP protocol. As illustrated, the standard request can contain a "DeviceIoRequest" field 400, a "FsInformationClass" field 402, an "InitialQuery" field 404, a Path Length field 406, as well as padding 408, and a path field 410.

The merged I/O request can further include an extension portion containing a merged I/O request buffer 412. This added buffer 412 can contain appended query directory I/O requests that were generated by the CDR server for querying and pre-fetching data for files other than the file in the received standard query directory I/O request. For example, this portion can contain query directory I/O requests for files file2-fileN (file1 metadata is queried in the initial standard portion 418 of the merged I/O request). For example, when the CDR server receives the standard query directory I/O request for metadata of file1, it can determine other files present (e.g., file2-fileN) in the directory based on the previously received file order list and generate query directory I/O requests for metadata of those files. The CDR server can then encode or embed the generated query directory I/O requests into the merged I/O request buffer 412 and append the buffer 412 to the received standard query directory I/O request for file1 portion 418 to produce the merged query directory I/O request.

In various embodiments, the merged I/O request buffer 412 can follow a self-defined protocol and be encoded with serialization library as a buffer. The merged I/O can be an extension to the original I/O packet following the RDP protocol definition, and it can be delivered and handled with the original RDPDR I/O request packet.

When the CDR client receives the merged query directory I/O request on the client side, it can first separate the merged I/O packet into the standard portion 418 and the appended I/O extension portion 412. The standard portion 418 can be executed, e.g., metadata for the requested file in the subdirectory (file1 in Folder1) can be retrieved and a corresponding query directory I/O response can be produced (QUERY_DIRECTORY (directory entry info for file1)).

The CDR client can parse (or decode) the merged I/O request buffer portion 412 and execute corresponding I/O operation defined in the merged I/O extension 412 (e.g., query directory I/O requests for file2 through fileN). For example, when the I/O operations in the extension 412 are executed, the CDR client can execute each constituent query directory I/O request in the extension buffer 412 to retrieve metadata of other files (file2-fileN) in the directory and the CDR client can produce corresponding query directory I/O responses.

Figure 4B:
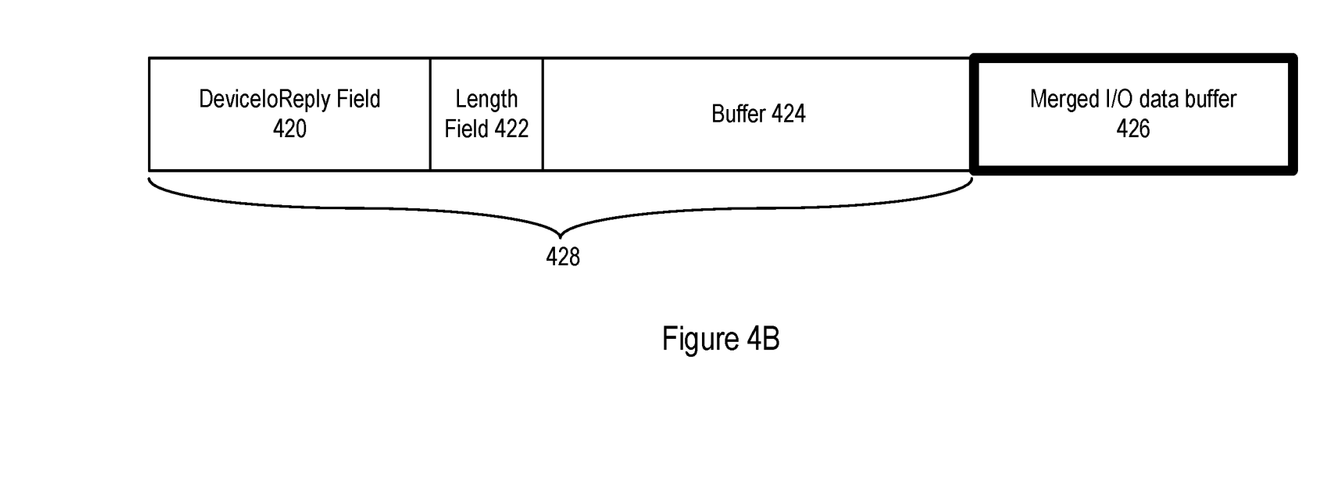
FIG. 4B is a diagram illustrating an example of a merged I/O response packet format, in accordance with various embodiments.

FIG. 4B is a diagram illustrating an example of a merged I/O response packet format, in accordance with various embodiments. This example may correspond to a merged query directory I/O response, which the CDR client can produce in response to the merged I/O request illustrated in FIG. 4A. The merged I/O response can contain a standard I/O response portion 428 (e.g., which can likewise follow the standard RDP protocol) that, for example, can contain a "DeviceIoReply" field 420, a length field 422, and a buffer field 424. This standard portion 428 can be the standard query directory I/O response to the standard query directory I/O request (e.g., the QUERY_DIRECTORY (enumerate file1) request) per the RDP protocol and include metadata of file1, for example. Hence, the CDR client can generate this portion 428 after it executes the standard query directory I/O request.

The example merged I/O response further contains a merged I/O data buffer 426. When the CDR client executes the merged I/O request buffer 412 of the merged I/O request, it can retrieve corresponding information (metadata for file2 through fileN) and produce corresponding I/O responses to the appended I/O requests in the buffer 412. The CDR client can embed or encode these responses into the merged I/O data buffer 426 and append the data buffer 426 to the standard response 428 portion to produce the merged I/O response.

When the CDR server receives the merged I/O response from the CDR client, it can separate the standard portion of the response 428 and convey it to the redirection driver in response to the previous query directory I/O request for file1 enumeration information as a standard (e.g., per protocol) query directory I/O response (e.g., QUERY_DIRECTORY (directory entry info for file1) in the example of FIG. 3). The CDR server can then parse or decode the merged I/O data buffer 426 to extract the embedded query directory I/O responses for the other files (e.g., file2 to fileN) and store these I/O responses in the cache so that future query directory I/O requests for this information can be quickly completed using this information from the cache.

In other embodiments, different types of I/O requests and responses, such as query information I/O requests and responses, can likewise be merged using this technique. For example, to form a merged query information I/O request, the CDR server can receive a standard query information I/O request for a class of information (e.g., standard information of a folder or file). The CDR server can generate additional query information I/O requests for additional information classes (e.g., basic information, attribute information, etc.), embed those requests into a buffer and attach the buffer to the packet containing the received standard query information I/O request, to produce the merged query information I/O request. Similarly, to produce a merged query directory I/O response, the CDR client can embed query information I/O responses into a buffer and attach the buffer to a standard query information I/O response.

It should be noted that, in various embodiments, a merged I/O request does not necessarily need to be produced by appending additional requests to an I/O request received from the redirection driver (which redirects the I/O request from the virtual desktop OS). The merged I/O request can be produced in other ways, for example, by embedding multiple I/O request in a merged I/O request and sending it independently to the client device (to the CDR client) without appending it to an existing or pending I/O request received from the redirection driver or the OS. The client can then likewise respond with a merged I/O response containing responses to the I/O requests contained in the merged I/O request.

Figure 5:
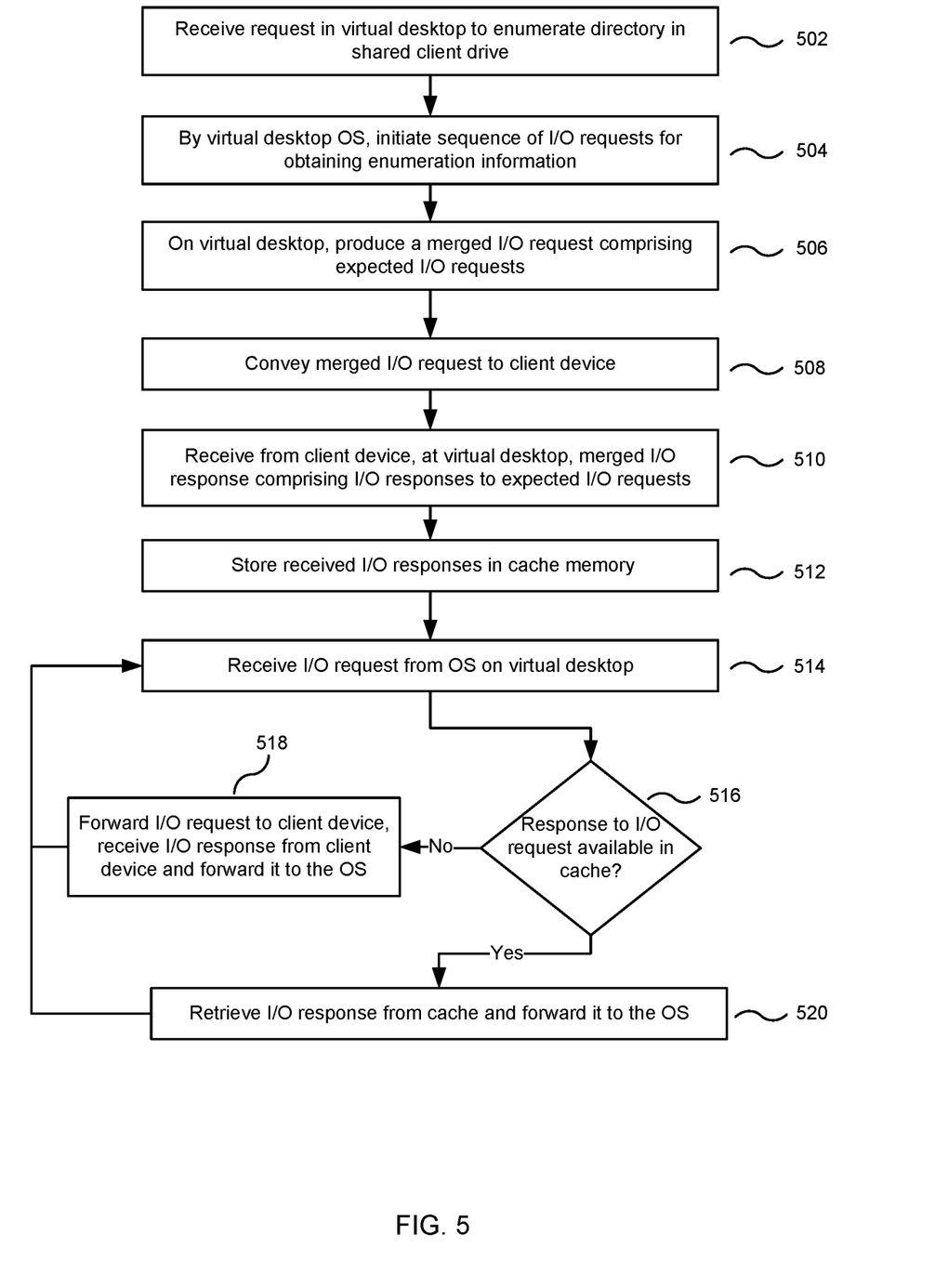
FIG. 5 illustrates an example process flow for efficient directory listing in client drive redirection on virtual desktops, in accordance with various embodiments.

FIG. 5 illustrates an example process flow for efficient directory listing in client drive redirection on virtual desktops, in accordance with various embodiments. The process can begin in operation 502, where a request can be received in the virtual desktop to enumerate a directory in a shared client drive. The shared client drive may be physically located on the client device and be redirected from the client device to the virtual desktop via CDR, as described above. The request to enumerate the directory in the virtual desktop can result from a user input, such as an input to copy a folder from the shared drive to the virtual desktop.

In operation 504, the virtual desktop OS can initiate a sequence of I/O requests for obtaining enumeration information. For example, in response to the instruction to enumerate the directory, the virtual desktop OS can begin making I/O requests to the shared client drive to obtain enumeration information for enumerating the directory. As described above, the I/O requests can be formatted and redirected by a redirection driver to a CDR server, which can send the requests to a CDR client on the client device. The CDR client can be configured to produce responses to the I/O requests and convey the responses back to the CDR server, which can forward them to the redirection driver, which can finally convey them to the OS (the I/O responses can be reformatted as necessary for the OS).

After the enumeration process is initiated on the virtual desktop, in operation 506, a merged I/O request can be produced (e.g., by the CDR server) comprising expected I/O requests. For example, I/O requests that are expected to be produced by the OS (and then forwarded by the redirection driver) can be determined (e.g., some expected requests such as query directory requests can be determined based on a file order list) and embedded into a merged I/O request in a single packet. As described previously, the merged I/O request can combine query directory I/O requests for metadata of different files contained in the enumerated directory, query information requests for different types of metadata of the enumerated directory itself, and other types of requests. As also described previously, the merged requests can be produced by appending additional requests to a received I/O request from the OS via the redirection driver.

In operation 508, the merged I/O request can be conveyed to the client device. For example, the merged I/O request can be conveyed to the CDR client on the client device. The client device can then parse the merged request to extract the individual I/O requests and execute each constituent request to generate corresponding I/O responses. The client device can then merge the responses to produce a merged I/O response, which can be in a single packet.

In operation 510, the virtual desktop can receive (e.g., vis CDR server) from the client device the merged I/O response comprising I/O responses to the expected I/O requests. The virtual desktop can parse the merged I/O response to separate the contained I/O response and in operation 512, the received I/O responses can be cached in cache memory on the virtual desktop. As described previously, if the merged I/O response contains a response to a pending I/O request from the OS to which the expected I/O requests were appended, then the corresponding I/O response for the pending I/O request can be forwarded to the redirection driver, which can then forward it to the OS.

In operation 514, an I/O request for enumeration information can be received from the OS on the virtual desktop (e.g., the I/O request may be produced by the OS and redirected by the redirection driver to the CDR server). The process can proceed to operation 516, where a decision is made on whether a response to the received I/O request is available in the cache. For example, the CDR server can check whether the response is available in the cache (e.g., whether the information has been pre-fetched).

If the response to the I/O request is available in the cache, the process can proceed to operation 520, where the corresponding I/O response can be retrieved from the cache and forwarded to the OS (via the redirection driver, and formatted as necessary) to be used in the directory enumeration. The process can then return to operation 514, where a subsequent I/O request is received from the OS.

If, on the other hand, the response to the I/O request is not available in cache in decision 516, the process can proceed to operation 518, where the I/O request can be forwarded to the client device, a corresponding I/O response can be received from the client device, and the I/O response can be forwarded to the virtual desktop OS (via the redirection driver, and formatted as necessary) to be used in the directory enumeration. The process can then return to operation 514, where a subsequent I/O request is received from the OS. The process can continue in this fashion until the directory is fully enumerated.

Figure 6:
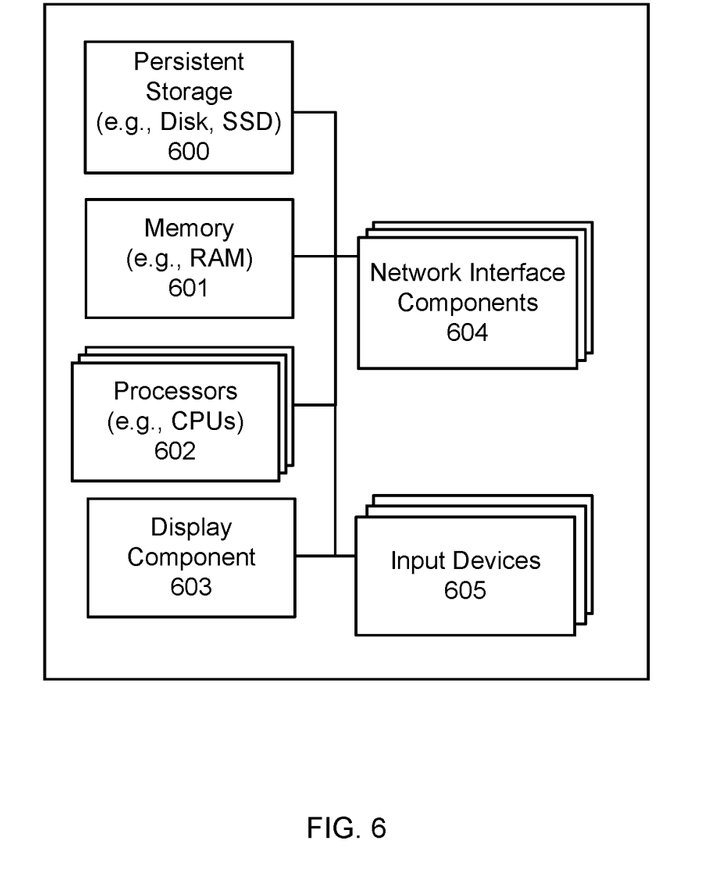
FIG. 6 illustrates an example of some general components of a computing device, in accordance with various embodiments.

FIG. 6 illustrates an example of some general components of a computing device, in accordance with various embodiments. In this particular example, the device includes one or more processors (e.g., central processing units (CPUs) 602 for executing instructions that can be stored in a storage medium component. The storage medium can include many types of memory, persistent data storage, or non-transitory computer-readable storage media. For example, the storage medium may take the form of random access memory (RAM) 601 storing program instructions for execution by the processor(s) 602, a persistent storage (e.g., disk or SSD) 600, a removable memory for sharing information with other devices and/or the like. The computing device typically can further comprise a display component 603, such as a monitor, a touch screen, liquid crystal display (LCD), or the like. In various embodiments, the computing device will include at least one input device 605 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 604 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method, comprising:
   establishing, over a network, a virtual desktop session between a virtual desktop executing on a host server and a client device;
   presenting a virtual drive in the virtual desktop corresponding to a shared client drive located on the client device, wherein a redirection driver executing in the virtual desktop is configured to route input and output requests targeting the virtual drive made by applications running in the virtual desktop to the shared client drive on the client device;
   receiving a request in the virtual desktop to enumerate a directory in the shared client drive;
   on the virtual desktop, determining one or more I/O requests expected to be produced by the virtual desktop operating system (OS) to enumerate the directory;
   producing a merged I/O request on the virtual desktop by embedding multiple I/O requests into a single packet, the merged I/O request comprising the one or more expected I/O requests; and
   conveying the merged I/O request to the client device.

2. The method of claim 1, further comprising:
   receiving a response to the merged I/O request at the virtual desktop, the response containing one or more I/O responses to the one or more expected I/O requests;
   caching the received one or more I/O responses in a cache residing on the virtual desktop;
   receiving an I/O request for enumeration information from the virtual desktop operating system; and
   completing the I/O request using the cached I/O response.

3. The method of claim 1, wherein the merged I/O request comprises one or more query directory I/O requests expected to be produced by the virtual desktop OS to enumerate the directory, each query directory I/O request requesting metadata of a different file contained in the directory.

4. The method of claim 3, further comprising:
   receiving a response to the merged I/O request at the virtual desktop, the response containing one or more query directory I/O responses to the one or more expected query directory I/O requests;
   caching the received one or more query directory I/O responses in a cache residing on the virtual desktop;
   receiving a query directory I/O request for metadata of a file in the directory from the virtual desktop operating system; and
   completing the query directory I/O request using the cached one or more query directory I/O responses.

5. The method of claim 1, further comprising:
   in the virtual desktop, receiving from the virtual desktop OS a query directory I/O request for metadata of a first file in the directory;
   wherein the determined one or more expected I/O requests comprise one or more query directory I/O requests expected to be produced by the virtual desktop OS to enumerate the directory, each query directory I/O request requesting metadata of a different file contained in the directory; and
   producing the merged I/O request by appending the determined one or more expected query directory I/O requests to the received query directory I/O request.

6. The method of claim 1, wherein the merged I/O request comprises one or more query information I/O requests expected to be produced by the virtual desktop OS to enumerate the directory, each query information I/O request requesting a different type of metadata about the directory.

7. The method of claim 2, wherein the response is produced on the client device by:
   executing a plurality of the expected I/O requests on the client device to produce a plurality of corresponding I/O responses; and
   merging the plurality of I/O responses into a single packet to produce the response.

8. A computing device, comprising:
   at least one processor; and
   memory including instructions that, when executed by the at least one processor, cause the computing device to perform the steps of:
   establishing, over a network, a virtual desktop session between a virtual desktop executing on a host server and a client device;
   presenting a virtual drive in the virtual desktop corresponding to a shared client drive located on the client device, wherein a redirection driver executing in the virtual desktop is configured to route input and output requests targeting the virtual drive made by applications running in the virtual desktop to the shared client drive on the client device;
   receiving a request in the virtual desktop to enumerate a directory in the shared client drive;
   on the virtual desktop, determining one or more I/O requests expected to be produced by the virtual desktop operating system (OS) to enumerate the directory;
   producing a merged I/O request on the virtual desktop by embedding multiple I/O requests into a single packet, the merged I/O request comprising the one or more expected I/O requests; and
   conveying the merged I/O request to the client device.

9. The computing device of claim 8, wherein the memory further includes instructions that when executed by the at least one processor, cause the computing device to perform the steps of:
   receiving a response to the merged I/O request at the virtual desktop, the response containing one or more I/O responses to the one or more expected I/O requests;
   caching the received one or more I/O responses in a cache residing on the virtual desktop;
   receiving an I/O request for enumeration information from the virtual desktop operating system; and
   completing the I/O request using the cached I/O response.

10. The computing device of claim 8, wherein the merged I/O request comprises one or more query directory I/O requests expected to be produced by the virtual desktop OS to enumerate the directory, each query directory I/O request requesting metadata of a different file contained in the directory.

11. The computing device of claim 10, wherein the memory further includes instructions that when executed by the at least one processor, cause the computing device to perform the steps of:
   receiving a response to the merged I/O request at the virtual desktop, the response containing one or more query directory I/O responses to the one or more expected query directory I/O requests;
   caching the received one or more query directory I/O responses in a cache residing on the virtual desktop;
   receiving a query directory I/O request for metadata of a file in the directory from the virtual desktop operating system; and
   completing the query directory I/O request using the cached one or more query directory I/O responses.

12. The computing device of claim 8, wherein the memory further includes instructions that when executed by the at least one processor, cause the computing device to perform the steps of:
   in the virtual desktop, receiving from the virtual desktop OS a query directory I/O request for metadata of a first file in the directory;
   wherein the determined one or more expected I/O requests comprise one or more query directory I/O requests expected to be produced by the virtual desktop OS to enumerate the directory, each query directory I/O request requesting metadata of a different file contained in the directory; and
   producing the merged I/O request by appending the determined one or more expected query directory I/O requests to the received query directory I/O request.

13. The computing device of claim 8, wherein the merged I/O request comprises one or more query information I/O requests expected to be produced by the virtual desktop OS to enumerate the directory, each query information I/O request requesting a different type of metadata about the directory.

14. The computing device of claim 9, wherein the response is produced on the client device by:
   executing a plurality of the expected I/O requests on the client device to produce a plurality of corresponding I/O responses; and
   merging the plurality of I/O responses into a single packet to produce the response.

15. A non-transitory computer readable storage medium comprising one or more sequences of instructions, the instructions when executed by one or more processors causing the one or more processors to execute the operations of:
   establishing, over a network, a virtual desktop session between a virtual desktop executing on a host server and a client device;
   presenting a virtual drive in the virtual desktop corresponding to a shared client drive located on the client device, wherein a redirection driver executing in the virtual desktop is configured to route input and output requests targeting the virtual drive made by applications running in the virtual desktop to the shared client drive on the client device;
   receiving a request in the virtual desktop to enumerate a directory in the shared client drive;
   on the virtual desktop, determining one or more I/O requests expected to be produced by the virtual desktop operating system (OS) to enumerate the directory;
   producing a merged I/O request on the virtual desktop by embedding multiple I/O requests into a single packet, the merged I/O request comprising the one or more expected I/O requests; and
   conveying the merged I/O request to the client device.

16. The non-transitory computer readable storage medium of claim 15, further comprising instructions that when executed by the one or more processors cause the one or more processors to execute the operations of:
   receiving a response to the merged I/O request at the virtual desktop, the response containing one or more I/O responses to the one or more expected I/O requests;
   caching the received one or more I/O responses in a cache residing on the virtual desktop;
   receiving an I/O request for enumeration information from the virtual desktop operating system; and completing the I/O request using the cached I/O response.

17. The non-transitory computer readable storage medium of claim 15, wherein the merged I/O request comprises one or more query directory I/O requests expected to be produced by the virtual desktop OS to enumerate the directory, each query directory I/O request requesting metadata of a different file contained in the directory.

18. The non-transitory computer readable storage medium of claim 17, further comprising instructions that when executed by the one or more processors cause the one or more processors to execute the operations of:
- receiving a response to the merged I/O request at the virtual desktop, the response containing one or more query directory I/O responses to the one or more expected query directory I/O requests;
- caching the received one or more query directory I/O responses in a cache residing on the virtual desktop;
- receiving a query directory I/O request for metadata of a file in the directory from the virtual desktop operating system; and
- completing the query directory I/O request using the cached one or more query directory I/O responses.

19. The non-transitory computer readable storage medium of claim 15, further comprising instructions that when executed by the one or more processors cause the one or more processors to execute the operations of:
- in the virtual desktop, receiving from the virtual desktop OS a query directory I/O request for metadata of a first file in the directory;
- wherein the determined one or more expected I/O requests comprise one or more query directory I/O requests expected to be produced by the virtual desktop OS to enumerate the directory, each query directory I/O request requesting metadata of a different file contained in the directory; and
- producing the merged I/O request by appending the determined one or more expected query directory I/O requests to the received query directory I/O request.

20. The non-transitory computer readable storage medium of claim 15, wherein the merged I/O request comprises one or more query information I/O requests expected to be produced by the virtual desktop OS to enumerate the directory, each query information I/O request requesting a different type of metadata about the directory.

* * * * *